(12) United States Patent
  Noethen

(10) Patent No.: US 11,604,333 B2
(45) Date of Patent: Mar. 14, 2023

(54) COMPACT HIGH RESOLUTION ATHERMAL OBJECTIVE LENS WITH FRONT APERTURE STOP

(71) Applicant: RAYTHEON COMPANY, Waltham, MA (US)

(72) Inventor: Mark Noethen, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 325 days.

(21) Appl. No.: 17/002,255

(22) Filed: Aug. 25, 2020

(65) Prior Publication Data
  US 2022/0066140 A1   Mar. 3, 2022

(51) Int. Cl.
  *G02B 11/06*   (2006.01)
  *G02B 13/00*   (2006.01)
  *G02B 7/02*    (2021.01)
  *G02B 13/02*   (2006.01)

(52) U.S. Cl.
  CPC ......... *G02B 13/0035* (2013.01); *G02B 7/028* (2013.01); *G02B 13/02* (2013.01)

(58) Field of Classification Search
  CPC .... G02B 13/0035; G02B 7/028; G02B 13/02; G02B 9/64; G02B 9/12; G02B 13/0045; G02B 15/143101; G02B 15/143103; G02B 15/146; G02B 15/1461
  See application file for complete search history.

(56) References Cited

U.S. PATENT DOCUMENTS

| 4,192,579 A | 3/1980 | Hyakumura |
| 4,733,951 A * | 3/1988 | Pareigat ................. G02B 17/02 359/833 |
| 5,737,120 A | 4/1998 | Arriola |
| 8,605,367 B2 | 12/2013 | Tsai et al. |
| 10,139,604 B2 | 11/2018 | Noethen |
| 10,281,694 B2 | 5/2019 | Avila et al. |
| 2004/0196575 A1* | 10/2004 | Nozawa ................... G02B 9/12 359/791 |

OTHER PUBLICATIONS

Dietzsch, E., "Front-stop photo lenses," Proc. SPIE 1780, Lens and Optical Systems Design, 17801T (Apr. 15, 1993); doi: 10.1117/12.142863.

* cited by examiner

*Primary Examiner* — Joseph P Martinez
(74) *Attorney, Agent, or Firm* — Lando & Anastasi, LLP

(57) ABSTRACT

An objective lens assembly includes a first lens group configured to have a positive refractive power, the first lens group being positioned to receive visible light along an optical path extending therethrough. The objective lens assembly further includes a second lens group configured to have a negative refractive power, the second lens group being positioned along the optical path to receive the visible light from the first lens group. The objective lens assembly further includes a center lens disposed between the first lens group and the second lens group and an aperture stop centered along the optical path and positioned in front of the first lens group to direct visible light from a scene to the first lens group.

19 Claims, 5 Drawing Sheets

COMPACT HIGH RESOLUTION ATHERMAL OBJECTIVE LENS WITH FRONT APERTURE STOP

BACKGROUND OF THE DISCLOSURE

1. Field of the Disclosure

The present disclosure relates to a compact optical lens assembly for imaging pickup, and more particularly to the optical lens assembly for imaging pickup comprised of multiple lenses behind the stop to provide passively athermal, zero vignetting, high resolution images.

2. Description of the Related Art

High-resolution imaging lenses are used in many different applications, such as electronic surveillance, photography, cell phones, smart devices, and aerial mapping applications, to name a few. The designs vary depending on many parameters, such as packaging requirements, cost, weight, resolution, vignetting, and environmental conditions. Lens parameters, such as field of view, focal length (EFL), f/#, stop location, back focal length (BFL), are among the most important design features. Families of lens types and their derivatives are often grouped into certain classes using these parameters, ratios of these parameters, or other combinations of them. Two common examples are "telephoto" or "inverse-telephoto" lens assemblies, which depend on the sign of the focal power of lens groups deposed about the stop. In addition, many of these will require a focus capability to compensate changes to object distance, altitude, or other reasons. Some may be required to be athermal (passively temperature compensated) by design choices of materials and their properties, such as linear coefficient of thermal expansion (CTE) and temperature coefficients of refractive index (dn/dT). Alternatively, one may use active athermal focus compensation methods or even both. In addition, vignetting may or may not be allowed.

Additionally, the housing material is also sensitive to thermal change, and should be addressed when considering an athermalized design.

The present disclosure refers to these design characteristics and of lens types in particular that utilizes a front aperture stop. U.S. Pat. No. 4,192,579 shows a Tessar photographic front stop lens with a telephoto ratio L/EFL (where L is the length from the front vertex to the image location and EFL is the effective focal length) of 1.06, an inverse telephoto ratio BFL/EFL (where BFL is the back focal length from the last lens to the image location) of 0.8, and an OAL/EFL ratio (where OAL is L-BFL) of 0.26.

A similar Tessar lens type is disclosed in "Front Stop Photo Lenses" in SPIE vol. 1780 Lens and Optical Systems Design 1992, with FIG. 2 showing lenses having ratios of 1.2, 0.75, and 0.45, respectively. Both of these simpler lens forms, while showing good field of view and distortion, when scaled and analyzed at the focal length, field of view, and f/# of the present disclosure, do not support the required MTF (image resolution). These are designed as objectives for photographic film use and thus did not require such high resolution. They also have vignetting typical to those designs.

Also disclosed in REF SPIE (1992) is another photographic lens objective revealed as a star sensor. While this reference discloses a similar EFL and field of view and is faster at f/1.4 with good distortion, it has significantly different constructional parameter ratios of 1.5, 0.1, and 1.4, which is a less compact design. This can be seen in the widely separated front and rear lens groups. Data for the design is not shown but it will likely support higher resolution than the simpler Tessar forms.

U.S. Pat. No. 8,605,367 shows an objective designed for electronic smart devices, such as cameras provided in presently available, cell phones or smart TVs. This patent discloses constructional parameter ratios of 1.22, 0.34, and 0.88, and is most similar to the concepts explored in the present disclosure. When scaled and analyzed at the focal length, field of view, and f/# of the present disclosure, such cameras do not support the required MTF.

In addition, none of the above references disclose a design that is athermal and only the star sensor discloses zero vignetting is possible.

Although U.S. Pat. Nos. 10,139,604 and 10,281,694 disclose some similar considerations, both reveal anamorphic designs while the concepts disclosed herein are non-anamorphic.

SUMMARY OF THE DISCLOSURE

One aspect of the present disclosure is directed to an objective lens assembly comprising a first lens group configured to have a positive refractive power, the first lens group being positioned to receive visible light along an optical path extending therethrough. The objective lens assembly further comprises a second lens group configured to have a negative refractive power, the second lens group being positioned along the optical path to receive the visible light from the first lens group. The objective lens assembly further comprises a center lens disposed between the first lens group and the second lens group and an aperture stop centered along the optical path and positioned in front of the first lens group to direct visible light from a scene to the first lens group.

Embodiments of the objective lens assembly further may include an optical receiver centered along the optical path and positioned to receive the visible light from the second lens group. The objective lens assembly further may include at least one filter positioned between the second lens group and the optical receiver. The objective lens assembly further may include a mirror positioned in front of the aperture stop. The objective lens assembly further may include a housing configured to support the first lens group, the second lens group, the center lens, and the optical receiver. The housing may define the aperture stop. The first lens group may include a first sub-group having up to four lenses and a second sub-group having up to four lenses. The first sub-group of the first lens group may include a first lens, a second lens, a third lens, and a fourth lens. The first lens may be a bi-convex lens, the second lens may be a bi-concave lens, the third lens may be a bi-convex lens, and the fourth lens may be a positive meniscus lens. The second sub-group of the first lens group may include a fifth lens, a sixth lens, a seventh lens, and an eighth lens. The fifth lens may be a positive meniscus lens, the sixth lens may be a plano concave lens, the seventh lens may be a bi-concave lens, and the eighth lens may be a bi-convex lens. The second lens group may include up to three lenses. The second lens group may include a first lens, a second lens, and a third lens. The first lens may be a bi-convex lens, the second lens may be a plano convex lens, and the third lens may be a bi-concave lens.

Another aspect of the present disclosure is directed to a method of detecting an image of a scene with an objective lens assembly. In one embodiment, the method comprises:

directing visible light through a first lens group of the objective lens assembly, the first lens group being configured to have a positive refractive power and positioned to receive visible light along an optical path extending through the objective lens assembly; directing visible light from the first lens group through a center lens to a second lens group of the objective lens assembly, the second lens group being configured to have a negative refractive power and being positioned along the optical path to receive the visible light from the first lens group and the center lens; and detecting an image from the visible light with an optical receiver centered along the optical path and positioned to receive the visible light from the second lens group. An aperture stop is centered along the optical path and positioned in front of the first lens group to direct visible light from the scene to the first lens group.

Embodiments of the method further may include the first lens group having a first sub-group with up to four lenses and a second sub-group with up to four lenses, the first sub-group having a first bi-convex lens, a second bi-concave lens, a third bi-convex lens, and a fourth positive meniscus lens, the second sub-group having a fifth positive meniscus lens, a sixth plano concave lens, a seventh bi-concave lens, and an eighth bi-convex lens. The second lens group may include includes up to three lenses, a first bi-convex lens, a second plano convex lens, and a third bi-concave lens. The method further may include passing visible light through at least one filter positioned between the second lens group and the optical receiver. The method further may include directing visible light from the scene to the objective lens assembly by a mirror positioned in front of the aperture stop. The objective lens assembly further may include a housing configured to support the first lens group, the second lens group, the center lens, and the optical receiver, the housing defining the aperture stop.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
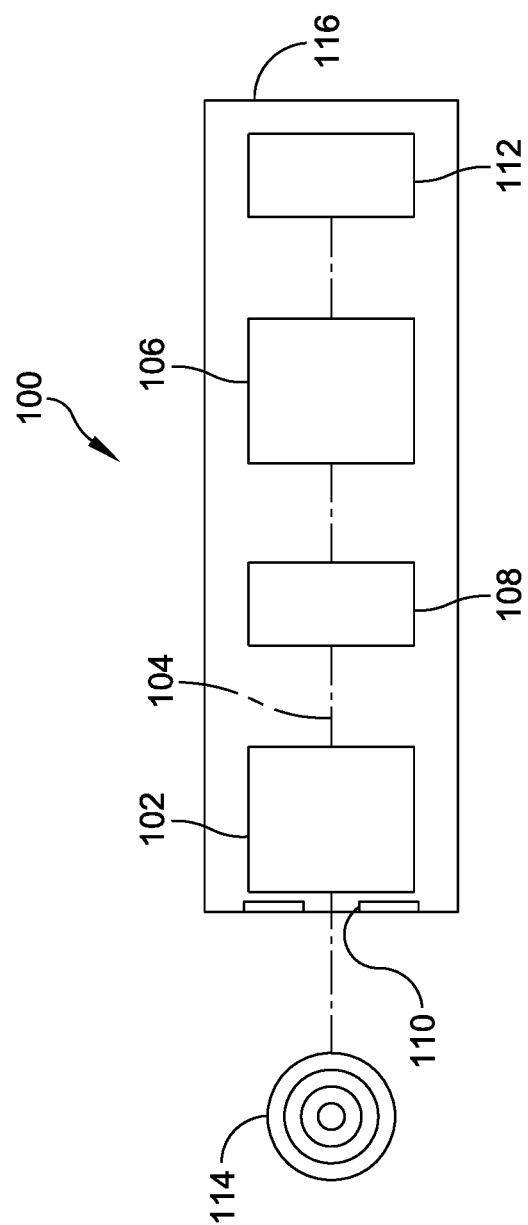
FIG. 1 is a schematic view of a compact high resolution athermal lens assembly having a front aperture stop of an embodiment of the disclosure.

For imaging systems with object side scan mirrors, it may be desired to have a pupil at or near the mirror. A pupil may either be relayed optically to be accessible, or, the aperture stop may be physically placed in front of the first lens. Embodiments of the system of the present disclosure use a front physical aperture stop, which is proximal to the first lens element of a front lens group for the most compact design. In addition, moderate back focal length (BFL) is required for filters while keeping a compact design. In addition, the design of the system is passive athermal utilizing several negative do/dT optical glass materials, while entirely in an aluminum barrel that functions as a housing. Moreover, the design of the system is required to support high resolution imagery such as found in sensors up to 26 Million pixels with no vignetting.

Embodiments of the present disclosure may include a system with constructional ratios of L/EFL, BFL/EFL, and OAL/EFL of 1.28, 0.25, and 1.03 respectively.

Embodiments of the present disclosure may include a system having several lens groups, such as a front group with positive refractive power and a rear group with negative refractive power. The system further may include a center meniscus lens deposed between the front lens group and the rear group. In one embodiment, the center meniscus lens may be positioned on a moveable stage for fine focus over change in range or altitude. In addition, the front group may be composed of two sub-groups exhibiting a front sub-group with positive power and a rear sub-group with negative power. In addition, the rear group may be composed of two sub-groups exhibiting a front sub-group with positive power and a rear sub-group with negative power.

Some wide area persistent search (WAPS) applications require a compact lens design with a front scanning mirror and therefore require some measure of pupil control in the optical design. Such WAPS applications also require high resolution imaging using 26 Mp visible/NIR sensors and require insensitivity to environmental temperature change during use. Embodiments of the system of the present disclosure addresses these issues by providing a compact, front stop, passive athermal lens design.

Front stop designs are often associated with simple single element landscape lenses that have moderate field of view, but are fairly slow (f/#>f/10). Other Front stop designs, such as some Tessar forms, have been documented for photographic applications in particular. For WAPS applications, the design will be more complex with several lens groups working in conjunction to achieve a compact high resolution VIS/NIR design with the front stop being required to minimize the footprint on the front scanning mirror. The particular lens design, lens groups (powers, focal lengths, and materials) combined with a front stop and resulting in a passive athermal performance are improvements over prior compact high resolution lens designs and must be free from the typical vignetting of the simpler Tessar forms.

The modulation transfer function (MTF) of an optical system, such as a camera, specifies how different spatial frequencies are handled by the system. It is used by optical engineers to describe how the optics project light from the object or scene onto a photographic film, detector array, retina, screen, or simply the next item in the optical transmission chain.

Accordingly, the various examples of the objective lens assembly discussed herein may be incorporated within wide area persistent scanning (WAPS) imaging systems and other imaging systems designed for platforms with limited available space.

Accordingly, various aspects and examples of the objective lens assembly discussed herein offer an improved lens design with a reduced size and weight. Particular embodiments may be incorporated within imaging systems that have limited available space. While discussed with reference to an aerial imaging system for the purpose of explanation, in various other examples the imaging system may be designed for a ground platform, a maritime platform, a space platform, or any other mobile platform or vehicle.

It is to be appreciated that embodiments of the systems and apparatuses discussed herein are not limited in application to the details of construction and the arrangement of components set forth in the following description or illustrated in the accompanying drawings. The systems and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1, illustrated is a block diagram of an objective lens assembly, generally indicated at 100, according to at least one example. The objective lens assembly 100 may include a first lens group 102 ("front" lens group) positioned along an optical path 104, a second lens group 106 ("rear" lens group) positioned along the optical path, a center lens 108 deposed between the front lens group and the rear group, and an aperture stop 110 centered along the optical path and positioned in front of the first lens group. The objective lens assembly 100 further includes and an optical receiver 112 positioned along the optical path 104 behind the second lens group 106. The aperture stop 110 is configured to receive visible light from a scene 114 along the optical path 104 and direct the visible light to the first lens group 102, the center lens 108, the second lens group 106 and the optical receiver 112, which is configured to detect an image of the scene.

As will be readily understood to one of ordinary skill in the art, the aperture stop 110 can be sized to limit an amount of light that can reach a focal plane. The size of the aperture stop 110 can be selected based on the intended use.

In various examples, the aperture stop 110, the first lens group 102, the center lens 108, the second lens group 106, and the optical receiver 112 of the objective lens assembly 100 are supported within a housing 116. The housing 116 holds, surrounds and protects the components of the objective lens assembly 100 from dirt, dust, moisture, and the like. The housing 116 may include a window through which the aperture stop 110 and the first lens group 102 receives the visible light from the scene 114. In one embodiment, the housing 116 defines the aperture stop 110.

In one embodiment, optical elements of the first lens group and the second lens group may be arranged in one or more sub-groups. The first lens group may include a plurality of lenses, e.g., eight, which are arranged to achieve positive refractive power. The second lens group may include a plurality of lenses, e.g., three, which are arranged to achieve negative refractive power.

In one embodiment, the center lens 108 is a meniscus lens, which may include a lens that has two spherical curved surfaces, convex on one side and concave on the other side, with the lens being thicker at the center than at the edges, which can be used for fine focusing.

Figure 2:
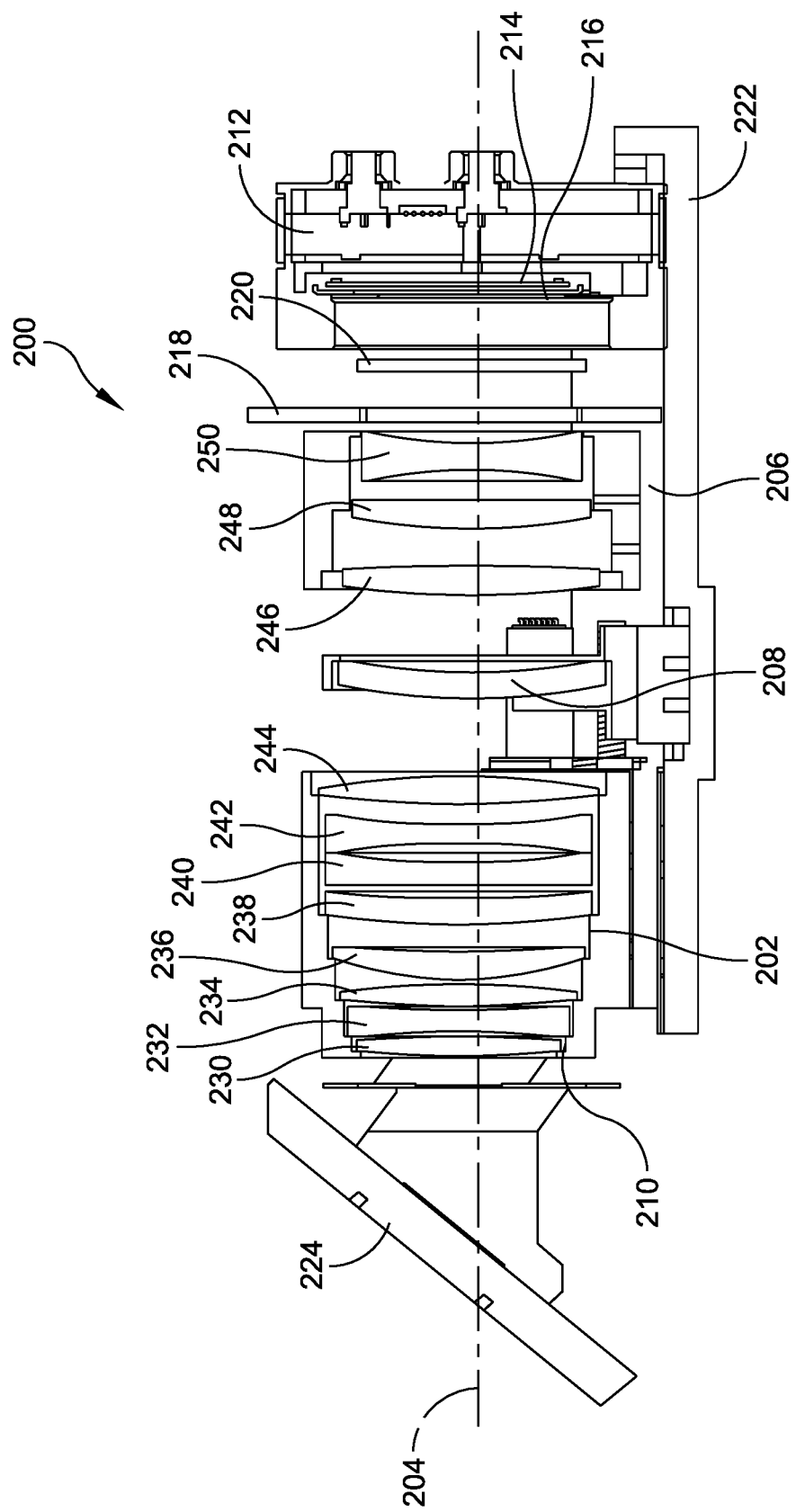
FIG. 2 is a cross-sectional view of a compact high resolution athermal lens assembly having a front aperture stop of another embodiment of the present disclosure.

FIG. 2 depicts in greater detail one example of the components of an objective lens assembly, generally indicated at 200, such as the objective lens assembly 100 illustrated in FIG. 1. In particular, the objective lens assembly 200 includes a first ("front") lens group 202 positioned along an optical path 204, a second ("rear") lens group 206 positioned along the optical path, a center lens 208 deposed between the front lens group and the rear lens group, and an aperture stop 210 centered along the optical path and positioned in front of the first lens group. The objective lens assembly 200 further includes an optical receiver 212 positioned along the optical path 204 behind the second lens group 206. Although not shown in FIG. 2, as with objective lens assembly 100, the aperture stop 210 of objective lens assembly 200 is configured to receive visible light from a scene along the optical path 204 and direct the visible light to the first lens group 202, the center lens 208, the second lens group 206 and the optical receiver 212, which is configured to detect an image of the scene.

As shown, the optical receiver 212 of the objective lens assembly 200 includes an image plane 214 that includes a cover 216 made from glass. In one embodiment, the objective lens assembly 200 further includes one of several possible selectable filters 218, followed by a cover glass 220 placed in front of the image plane 214 of the optical receiver 212. As with objective lens assembly 100, the aperture stop 210 of the objective lens assembly 200 is configured to receive visible light from a scene along the optical path 204 and direct the visible light to the first lens group 202, the center lens 208, the second lens group 206 and the optical receiver 212.

The objective lens assembly 200 further includes a housing 222, which is configured to support the aperture stop 210, the first lens group 202, the center lens 208, the second lens group 206, the filters 218, 220, and the optical receiver 212. The housing 222 supports, surrounds and protects the components of the objective lens assembly 200, and may be fabricated from aluminum, for example. Other suitable materials may also be employed. The housing 222 may include a window through which the aperture stop 210 and the first lens group 202 receive the visible light from the scene. In the shown embodiment, the objective lens assembly 200 further may include a full mirror 224, which is supported by the housing 222 and positioned in front of the aperture stop 210.

FIG. 2 further illustrates the constituent parts of the first lens group 202 and the second lens group 206. As shown, the first lens 202 group includes up to eight lenses disposed centrally along the optical path 204. In one embodiment, the first lens group includes a first sub-group having a first lens (bi-convex) 230, a second lens (bi-concave) 232, a third lens (bi-convex) 234, and a fourth lens (positive meniscus) 236. The first lens group further includes a second sub-group having a fifth lens (positive meniscus) 238, a sixth lens (piano concave) 240, a seventh lens (bi-concave) 242, and an eighth lens (bi-convex) 244. The arrangement of the lenses 230, 232, 234, 236, 238, 240, 242, 244 of the first and second sub-groups of the first lens group 202 is configured to achieve a positive refractive power. In one embodiment, a dedicated housing supported by housing 222 may be used to support the lenses 230, 232, 234, 236, 238, 240, 242, 244 of the first lens group 202.

Further shown in FIG. 2, the second lens group 206 includes up to three lenses disposed centrally along the optical path. In one embodiment, the second lens group 206 includes a first lens (bi-convex) 246, a second lens (piano convex) 248, and a third lens (bi-concave) 250. The arrangement of the lenses 246, 248, 250 of the second lens group 206 is configured to achieve a negative refractive power. In one embodiment, a dedicated housing supported by housing 222 may be used to support the lenses 246, 248, 250 of the second lens group 206.

In one embodiment, the center lens 208 is a meniscus lens, which can be used for fine focusing. In one embodiment, a dedicated housing supported by housing 222 may be used to support the center lens 208.

In one embodiment, the lenses of the first lens group 202 is configured in a first sub-group and a second sub-group, with lenses 230, 232, 234, 236 of the first sub-group having a positive refractive power and lenses 238, 240, 242, 244 of the second sub-group having a negative refractive power. In a particular embodiment, lenses 230, 234, 236 of the first sub-group have positive refractive power and lens 232 of the first sub-group has negative refractive power resulting in a Petzval curvature of −0.201. Lenses 238, 244 of the second sub-group have positive refractive power and lenses 240, 242 of the second sub-group have negative refractive power resulting in a Petzval curvature of +0.124. The result is that the first lens group 202 is configured to achieve a Petzval curvature of −0.0771.

The lenses of the second lens group 206 is configured in a first sub-group and a second sub-group, with the lenses 246, 248 of the first sub-group having a positive refractive power and lens 250 of the second sub-group having a negative refractive power. Lenses 246, 248 of the first sub-group have positive refractive power resulting in a Petzval curvature of −0.231. Lens 250 of the second sub-group has negative refractive power resulting in a Petzval curvature of +0.308. The result is that the second lens group 206 is configured to achieve a Petzval curvature of +0.0776.

In one embodiment, the center lens 208 is a meniscus lens having weak positive refractive power to provide sensitive focus movement ratio of 5:1 to the image plane 214. The center lens 208 has a Petzval curvature of −0.019.

Accordingly, the configuration of the first lens group 202 and the second lens group 206 achieve a widely separated front positive lens group and rear negative lens group to form a telephoto-type lens with a balanced Petzval curvature (flat field) system, which is −0.185 or 12 times the EFL. It is to be understood that other lens combinations can be configured to achieve a balanced Petzval curvature.

It should be understood that a person of ordinary skill in the art, given the benefit of the present disclosure, can configure the objective lens assembly 200 so that the optical elements of each of the first lens group 202 and the second lens group 206 are arranged in more than one sub-group within the respective lens group. In the shown example, optical elements of the first lens group 202 may be arranged in a first sub-group (e.g., the first lens 230, the second lens 232, the third lens 234, and the fourth lens 236) and a second sub-group (e.g., the fifth lens 238, the sixth lens 240, the seventh lens 242, and the eighth lens 244). However, other configurations of the first lens group 202 and/or the second lens group 206 may be provided.

The lenses in the first sub-group of the first lens group 202 (e.g., the first lens 230, the second lens 232, the third lens 234, and the fourth lens 236) may be composed with net positive power while the second sub-group of lens group 202 (e.g., the fifth lens 238, the sixth lens 240, the seventh lens 242, and the eighth lens 244) may be composed with a net negative power.

The lenses in the first sub-group of the second lens group 206 (e.g., the first lens 246, and the second lens 248) may be composed with net positive power while the second sub-group of lens group 206 (e.g., the lens 250) may be composed with a net negative power.

These in combination result in a high resolution flat field image with minimal Petzval, coma, astigmatism, spherical, and distortion aberrations over the field of view and f/# required.

TABLE 1 below provides data of the lenses of the first lens group, the meniscus lens, and the second lens group.

TABLE 1

|  | Radius | thickness | Nd | Vd | CTE *1e−06/C | dn/dT *1e−6/C |
| --- | --- | --- | --- | --- | --- | --- |
| stop | inf | 0.020 |  |  |  |  |
| Lens 1 | 7.550 | 0.160 | 1.57135 | 53 | 9.5 | −0.6 |
|  | −7.550 | 0.053 |  |  |  |  |
| Lens 2 | −4.239 | 0.160 | 1.738 | 32.3 | 6.9 | 5.2 |
|  | 7.532 | 0.020 |  |  |  |  |
| Lens 3 | 5.210 | 0.193 | 1.57135 | 53 | 9.5 | −0.6 |
|  | −5.210 | 0.020 |  |  |  |  |
| Lens 4 | 2.118 | 0.236 | 1.57135 | 53 | 9.5 | −0.6 |
|  | 7.411 | 0.209 |  |  |  |  |
| Lens 5 | 4.862 | 0.220 | 1.51742 | 52.4 | 8 | 2.3 |
|  | 7.579 | 0.094 |  |  |  |  |
| Lens 6 | inf | 0.174 | 1.72825 | 28.5 | 8 | 2.5 |
|  | 2.892 | 0.179 |  |  |  |  |
| Lens 7 | −4.571 | 0.160 | 1.48749 | 70.2 | 9 | −0.9 |
|  | 3.531 | 0.142 |  |  |  |  |
| Lens 8 | 6.151 | 0.238 | 1.65844 | 50.9 | 6.8 | 4.1 |

TABLE 1-continued

|  | Radius | thickness | Nd | Vd | CTE *1e-06/C | dn/dT *1e-6/C |
|---|---|---|---|---|---|---|
|  | -4.169 | 0.547 |  |  |  |  |
| Lens 9 | 3.302 | 0.198 | 1.74077 | 27.8 | 8.3 | 2.2 |
|  | 3.882 | 0.552 |  |  |  |  |
| Lens 10 | 4.810 | 0.210 | 1.63854 | 55.4 | 7 | 2.5 |
|  | -12.700 | 0.267 |  |  |  |  |
| Lens 11 | 3.223 | 0.199 | 1.63854 | 55.4 | 7 | 2.5 |
|  | inf | 0.223 |  |  |  |  |
| Lens 12 | -2.5 | 0.199 | 1.6398 | 34.5 | 8 | 2.2 |
|  | 2.5 |  |  |  |  |  |

Figure 3:
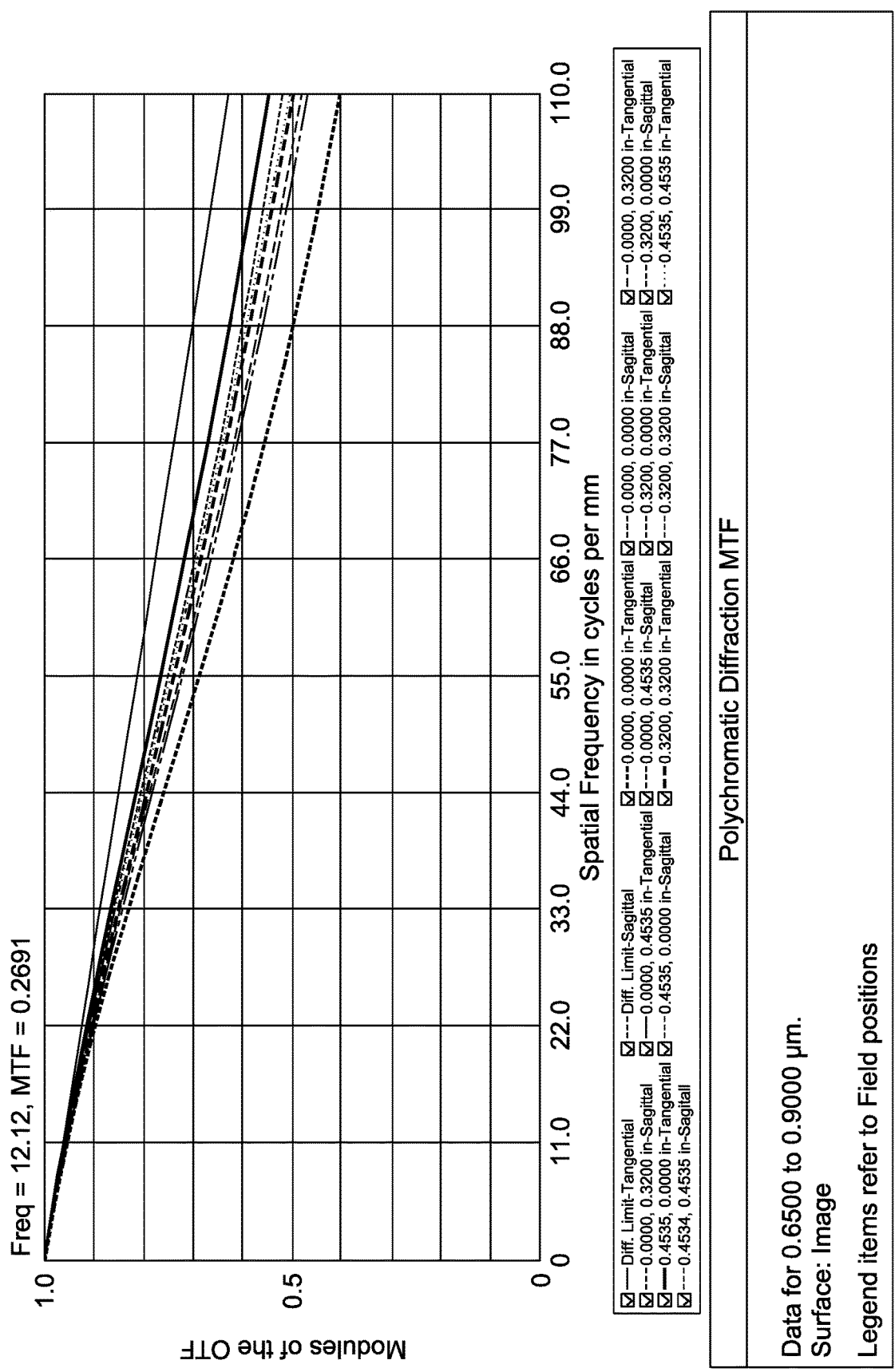
FIG. 3 is a graph showing modulation transfer function (MTF) versus special frequency (in cycles per millimeter (mm)) at −40° C.
Figure 4:
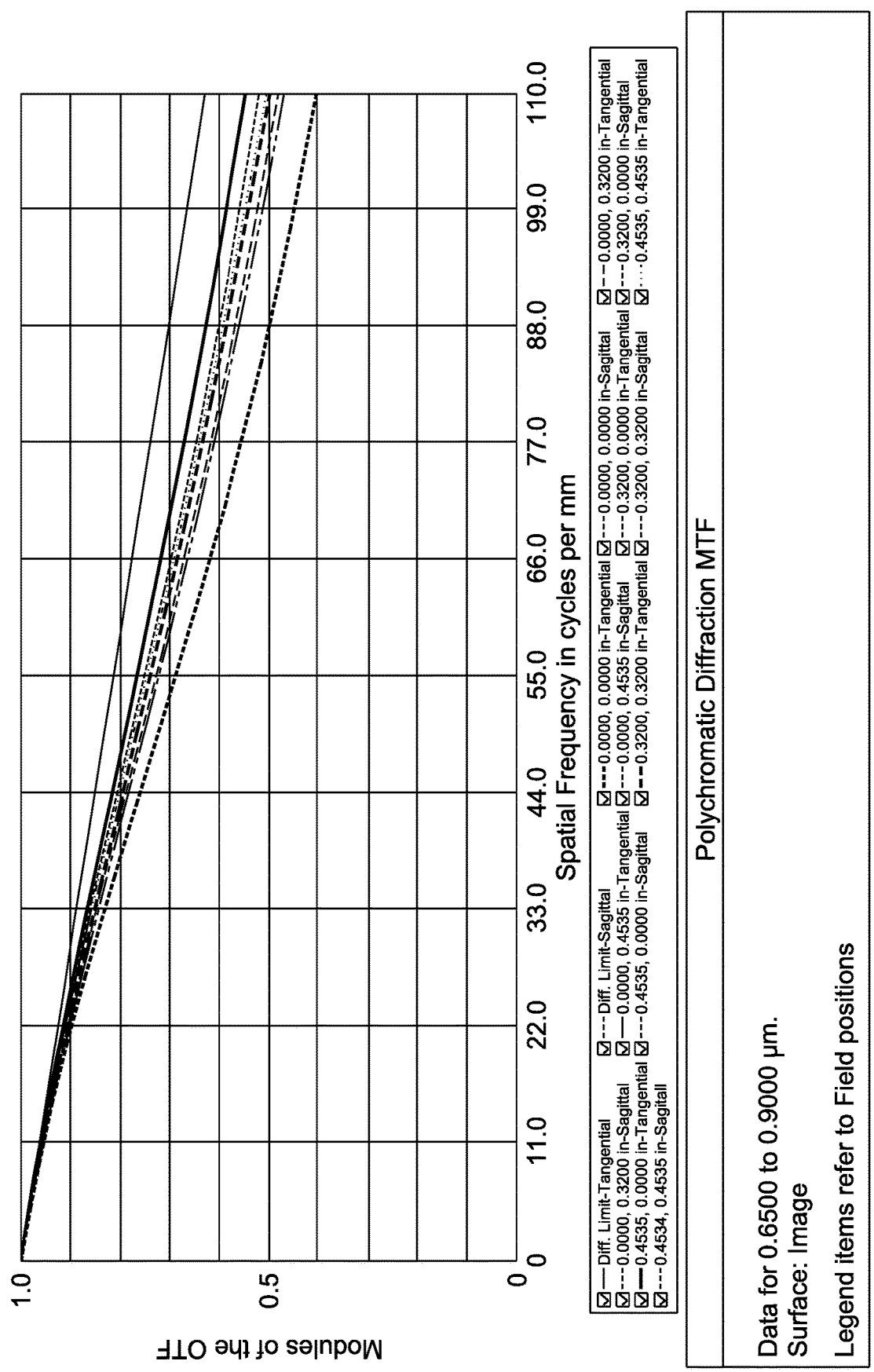
FIG. 4 is a graph showing MTF versus special frequency (in cycles per mm) at +20° C.
Figure 5:
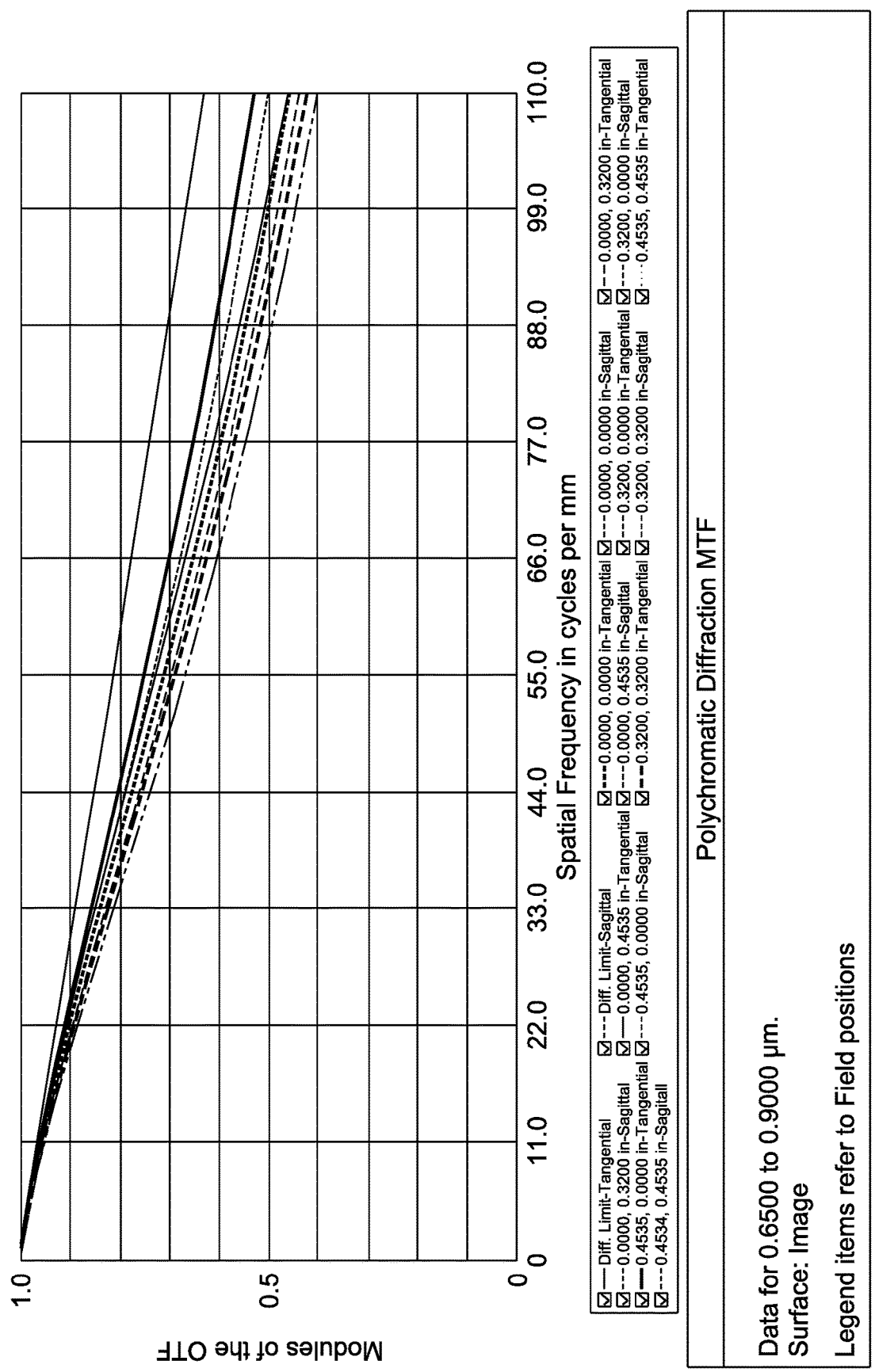
FIG. 5 is a graph showing MTF versus special frequency (in cycles per mm) at +100° C.

FIGS. 3, 4 and 5 illustrate graphs showing modulation transfer function (MTF) versus special frequency (in cycles per millimeter (mm)) at -40° C., +20° C., and +100° C., respectively showing the passive athermal design in this embodiment.

As such, aspects and examples described herein provide a compact objective lens assembly which has a reduced total length for a given focal length. As a result of the reduced size and weight of the discussed objective lens assembly, examples may be incorporated within platforms in which available space is limited and weight is a significant design factor.

Having described above several aspects of at least one example, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. An objective lens assembly comprising:
a first lens group configured to have a positive refractive power, the first lens group including two sub-groups of lenses, a first sub-group having a plurality of lenses having a positive refractive power and a second sub-group having a plurality of lenses having a negative refractive power, the first lens group being positioned to receive visible light along an optical path extending therethrough;
a second lens group configured to have a negative refractive power, the second lens group including two sub-groups of lenses, a third sub-group having two lenses having a positive refractive power and a fourth sub-group having at least one lens having a negative refractive power, the second lens group being positioned along the optical path to receive the visible light from the first lens group;
a center lens disposed between the first lens group and the second lens group, the center lens including a positive meniscus lens having weak positive refractive power; and
an aperture stop centered along the optical path and positioned in front of the first lens group to direct visible light from a scene to the first lens group.

2. The objective lens assembly of claim 1, wherein the plurality of lenses of the first sub-group of the first lens group includes up to four lenses and the plurality of lenses of the second sub-group includes up to four lenses.

3. The objective lens assembly of claim 2, wherein the first sub-group of the first lens group includes a first lens, a second lens, a third lens, and a fourth lens.

4. The objective lens assembly of claim 3, wherein the first lens is a bi-convex lens, the second lens is a bi-concave lens, the third lens is a bi-convex lens, and the fourth lens is a positive meniscus lens.

5. The objective lens assembly of claim 2, wherein the second sub-group of the first lens group includes a fifth lens, a sixth lens, a seventh lens, and an eighth lens.

6. The objective lens assembly of claim 5, wherein the fifth lens is a positive meniscus lens, the sixth lens is a plano concave lens, the seventh lens is a bi-concave lens, and the eighth lens is a bi-convex lens.

7. The objective lens assembly of claim 2, wherein the two lenses of the third sub-group of the second lens group includes a first lens and a second lens, and the at least one lens of the fourth sub-group of the second group includes a third lens.

8. The objective lens assembly of claim 7, wherein the first lens is a bi-convex lens, the second lens is a plano convex lens, and the third lens is a bi-concave lens.

9. The objective lens assembly of claim 1, further comprising an optical receiver centered along the optical path and positioned to receive the visible light from the second lens group.

10. The objective lens assembly of claim 9, further comprising at least one filter positioned between the second lens group and the optical receiver.

11. The objective lens assembly of claim 9, further comprising a mirror positioned in front of the aperture stop.

12. The objective lens assembly of claim 9, further comprising a housing configured to support the first lens group, the second lens group, the center lens, and the optical receiver.

13. The objective lens assembly of claim 12, wherein the housing defines the aperture stop.

14. A method of detecting an image of a scene with an objective lens assembly, the method comprising:
directing visible light through a first lens group of the objective lens assembly, the first lens group being configured to have a positive refractive power and positioned to receive visible light along an optical path extending through the objective lens assembly, the first lens group including two sub-groups of lenses, a first sub-group having a plurality of lenses having a positive refractive power and a second sub-group having a plurality of lenses having a negative refractive power;
directing visible light from the first lens group through a center lens to a second lens group of the objective lens assembly, the second lens group being configured to have a negative refractive power and being positioned along the optical path to receive the visible light from the first lens group and the center lens, the second lens group including two sub-groups of lenses, a third sub-group having two lenses having a positive refractive power and a fourth sub-group having at least one lens having a negative refractive power; and detecting an image from the visible light with an optical receiver centered along the optical path and positioned to receive the visible light from the second lens group, wherein the center lens includes a positive meniscus lens having weak positive refractive power, and wherein an aperture stop is centered along the optical path and positioned in front of the first lens group to direct visible light from the scene to the first lens group.

15. The method of claim 14, wherein the plurality of lenses of the first sub-group of the first lens group includes up to four lenses and the plurality of lenses of the second sub-group includes up to four lenses, the first sub-group having a first bi-convex lens, a second bi-concave lens, a third bi-convex lens, and a fourth positive meniscus lens, the second sub-group having a fifth positive meniscus lens, a sixth plano concave lens, a seventh bi-concave lens, and an eighth bi-convex lens.

16. The method of claim 14, wherein the two lenses of the third sub-group of the second lens group includes a first bi-convex lens and a second plano convex lens, and the at least one lens of the fourth sub-group of the second lens group includes a third bi-concave lens.

17. The method of claim 14, further comprising passing visible light through at least one filter positioned between the second lens group and the optical receiver.

18. The method of claim 14, further comprising directing visible light from the scene to the objective lens assembly by a mirror positioned in front of the aperture stop.

19. The method of claim 14, wherein the objective lens assembly further includes a housing configured to support the first lens group, the second lens group, the center lens, and the optical receiver, the housing defining the aperture stop.

\* \* \* \* \*